United States Patent
Webb

(10) Patent No.: US 6,594,312 B1
(45) Date of Patent: Jul. 15, 2003

(54) METHOD AND APPARATUS FOR MOTION ESTIMATION QUANTIZATION DITHERING

(75) Inventor: Richard W. Webb, Los Gatos, CA (US)

(73) Assignee: ATI International Srl, Barbados (KN)

( * ) Notice: Subject to any disclaimer, the term of this patent is extended or adjusted under 35 U.S.C. 154(b) by 496 days.

(21) Appl. No.: 09/652,956

(22) Filed: Aug. 31, 2000

(51) Int. Cl.[7] .................................................. H04N 7/32
(52) U.S. Cl. ............................. 375/240.12; 375/240.16
(58) Field of Search ....................... 375/240.16, 240.17, 375/240.12; H04N 7/32

(56) References Cited

U.S. PATENT DOCUMENTS 6,363,117 B1 * 3/2002 Kok ..................... 375/240.24

\* cited by examiner

Primary Examiner—Howard Britton

(57) ABSTRACT

A method and apparatus that reduce the complexity of motion estimation while providing better quality for a particular level of reduced resolution than previously available are described. The method and apparatus involve motion estimation quantization dithering to avoid quantization error effects when reducing the resolution, for example, from eight-bit pixel intensity values to two-bit pixel intensity values. Consequently, an embodiment of the invention provides efficient motion estimation using statistically accurate reduced resolution representations.

28 Claims, 7 Drawing Sheets

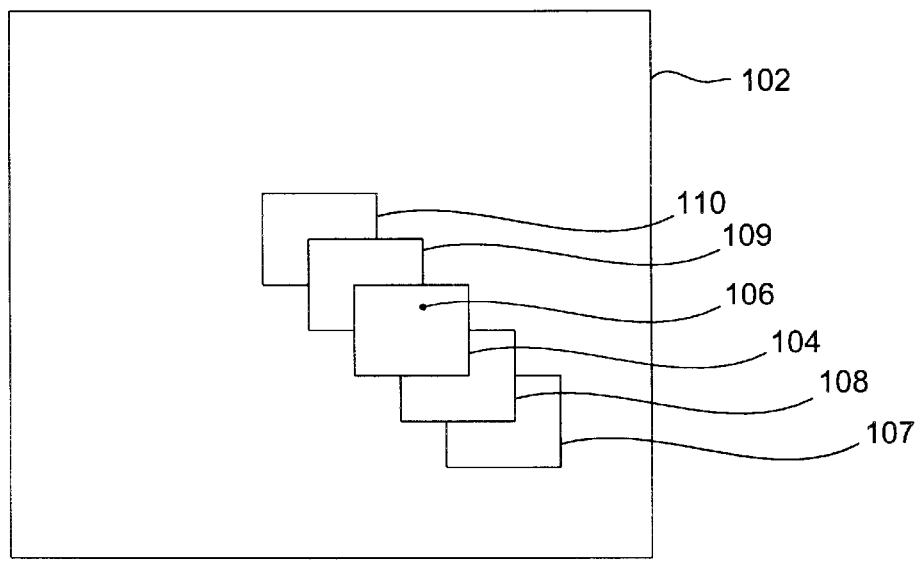
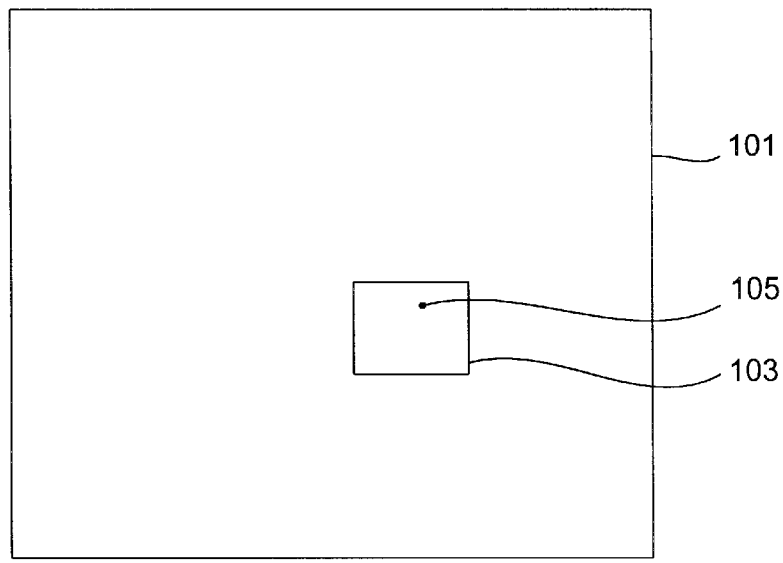
FIG. 1

METHOD AND APPARATUS FOR MOTION ESTIMATION QUANTIZATION DITHERING

TECHNICAL FIELD OF THE INVENTION

The invention relates generally to video compression and, more specifically, to reducing the complexity of motion estimation.

BACKGROUND OF THE INVENTION

Image information, for example, motion picture information, video information, animated graphics information, etc., often involves large amounts of data. Image information often includes data to represent coloring, shading, texturing, and transparency of every pixel in every frame of the image information. Each frame may include hundreds of thousands or even millions of pixels. The frames are often presented in rapid succession, for example, at a rate of 30 frames per second, to convey a sense of motion. Thus, without some form of data compression, such image information could easily involve hundreds of millions of bits per second.

To avoid the need to store and transmit such large amounts of data, data compression techniques have been developed. Some data compression techniques have been designed to compression image information. Video compression converts a sequence of digital video frames, each comprising an array of pixel values, into a smaller (in terms of number of bits used for storage and transmission) and more efficient representation.

One example is the type of encoding specified by the Moving Picture Experts Group (MPEG). MPEG encoding is widely used, and its uses include internet video transmission, DVD (digital video disks), and HDTV (high-definition television). MPEG encoding produces a stream of different types of frames. These frames include intra frames and non-intra frames. The intra frames include sufficient information to reconstruct a frame of unencoded image information without the need to reference other frames of encoded data. The non-intra frames, however, provide information that refers to other information encoded in intra frames or other non-intra frames. Unencoded frames represented by the non-intra frames may be reconstructed by applying the information contained in the non-intra frames to the information contained in the intra frames to which the non-intra frames refer.

Since the amount of information stored in non-intra frames is much smaller than the amount of information in the unencoded frames that the non-intra frames represent, the use of non-intra frames can help greatly reduce the amount of image information that needs to be stored or transmitted. One aspect of the non-intra frames that allows them to contain less information than the unencoded frames they represent is that the non-intra frames essentially recycle image information found in the intra frames. For example, an unencoded frame represented by an intra frame may depict several objects. The objects may be located in several areas of the frame. Since the advantage of moving images, such as motion pictures, video, and animated graphics, over still images is the ability of the moving images to convey a sense of motion, the objects located in several areas of the frame often move to different areas when they appear in subsequent frames.

Since the image information needed to represent the appearance of the objects is present in the intra frames, that information may be recycled in non-intra frames. The non-intra frames contain the information needed to update the location of the objects without having to contain all of the information needed to express the appearance of the objects. Therefore, to encode non-intra frames, the change in the position of the objects represented in the non-intra frames is determined relative to the position of the objects represented in the intra frames.

One technique that has been used to determine the change in the position of objects represented in non-intra frames involves dividing an image into image blocks (i.e., square blocks of pixels within the image). Then a determination is made as to where the block of pixels was located in the previous frame. This process is done by matching the pattern one block at a time.

In greater detail, the process includes several steps. First, the current (non-intra, or predicted) frame is divided into blocks. Then, for each block, a collection of potentially matching blocks is defined in the reference (intra or predicted) frame. Then, all of the pixel differences are added up using absolute differences to determine a score. The matching block that has the best score is then selected.

A motion vector is used to represent the change from the location of the matching block in the reference frame with the best score to the location of the block in the current frame. Motion estimation is a process for identifying the optimal values for motion vectors. Motion estimation is typically performed by considering many motion vectors in a search window and evaluating the quality of the matches represented by the motion vectors. Computing the quality of the matches to determine the best match typically requires a very large number of numerical operations. At the culmination of the motion estimation process, the motion vector is used to encode one or more non-intra frames for a sequence of images. The information encoded in the non-intra frames may then be used for motion compensation to reconstruct the sequence of images when the non-intra frames are decoded.

Since motion estimation is the most computationally taxing stage of typical video compression techniques, such as MPEG video compression, reducing the complexity of the motion estimation process reduces the processing capability needed to perform video compression, allows the video compression to be performed more quickly, and allows a greater amount of video information to be compressed in a given amount of time.

One approach to reducing the complexity of numerical operations for motion estimation is disclosed in U.S. Pat. No. 5,712,799, issued to Farmwald et al. and owned by the assignee of the present application. Farmwald et al. disclose a method and structure for performing motion estimation using reduced precision pixel intensity values. The pixel intensity values of the pixels in the current block are averaged to determine a first average pixel intensity value. The pixel intensity values of the current block which have a pixel intensity value less than the first average pixel intensity value are averaged to determine a second average pixel intensity value. The pixel intensity values of the current block which have a pixel intensity value greater than the first average pixel intensity value are averaged to determine a third average pixel intensity value. The first, second, and third average pixel intensity values are used to determine thresholded pixel intensity values for the current block pixels. and the search window pixels, thereby creating a thresholded current block and a thresholded search window.

Farmwald et al. provide a particular technique for reducing the precision of pixel intensity values, for example, to allow pixel intensity values to be expressed as two-bit representations rather than eight-bit values. By operating on the two-bit representations rather than on the eight-bit values, the complexity of certain block matching computations used for motion estimation is significantly reduced.

However, the teachings of Farmwald et al. do not guarantee that the best possible block match score estimate will be obtained. Thus, less than optimal motion vectors may be selected and the quality of the compressed video produced according to the motion estimation technique of Farmwald et al. may be compromised. Thus, a method and apparatus that reduce the complexity of the motion estimation process without compromising quality are needed.

BRIEF DESCRIPTION OF THE DRAWINGS

FIG. 1 is a block diagram illustrating a current frame and a reference frame as used in conjunction with an embodiment of the present invention.

DETAILED DESCRIPTION OF A PREFERRED EMBODIMENT

Figure 2:
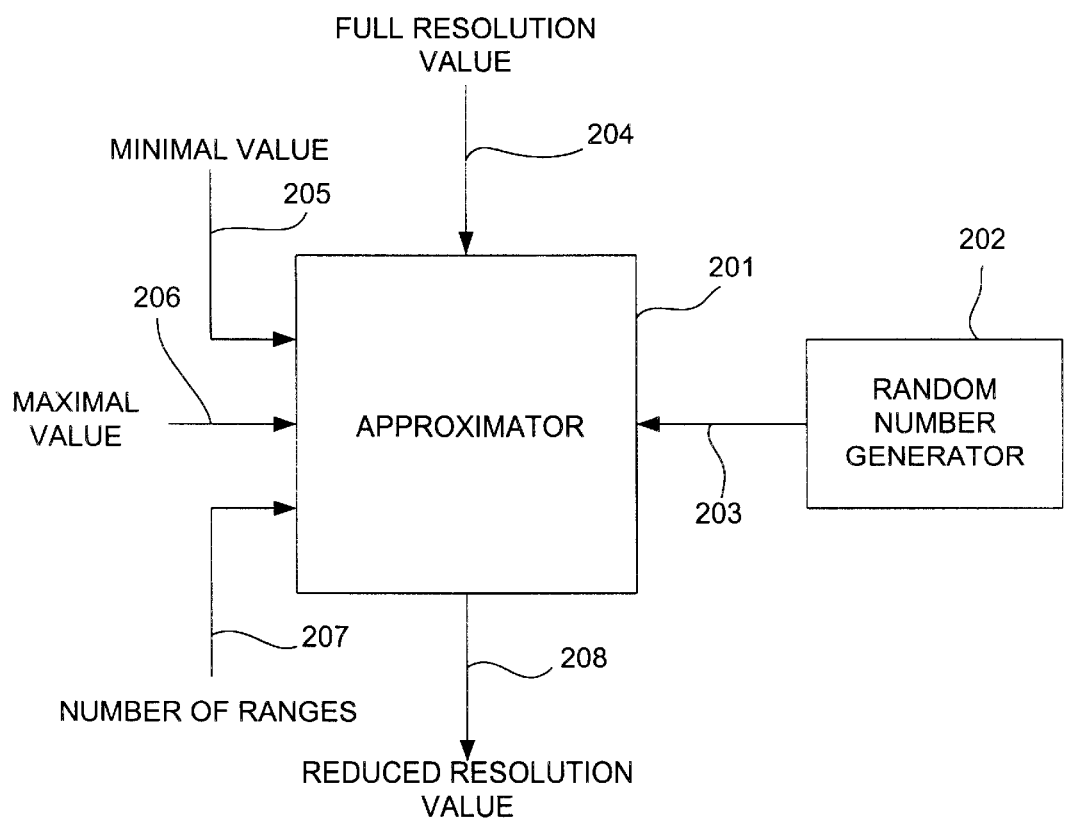
FIG. 2 is a block diagram illustrating an embodiment of the present invention. A random number generator 202 is coupled via coupling 203 to approximator 201.

A method and apparatus that reduce the complexity of motion estimation while providing better quality for a particular level of reduced resolution than previously available are described. The method and apparatus involve motion estimation quantization dithering to avoid quantization error effects when reducing the resolution, for example, from eight-bit pixel intensity values to two-bit pixel intensity values. Consequently, an embodiment of the invention provides efficient motion estimation using statistically accurate reduced resolution representations.

FIG. 1 is a block diagram illustrating a current frame and a reference frame as used in conjunction with an embodiment of the present invention. Current block 103, which includes current frame pixel 105, is defined within current frame 101. Search window 104, which include reference frame pixel 106, is defined within reference frame 102. Additional instances 107, 108, 109, and 1 10 of search window 104 may be defined in reference frame 102. To provide motion estimation for current block 103 or current frame pixel 105, the most likely former location of current block 103 or current frame pixel 105 within reference frame 102 may be identified using search window 104 and alternate instances 107, 108, 109, and 110 of search window 104. Current block 103 or current frame pixel 105 is quantified to produce a current frame comparison value. Reference frame pixel 106 or search window 104, as well as other instances 107, 108, 109, and 110 of search window 104, are quantified to produce reference frame comparison values. The current frame comparison value is compared to the reference frame comparison values, and the closest match is identified. The location in the reference frame represented by the closest match is used to identify the most likely former location of current block 103 or current frame pixel 105.

Once the most likely former location of current block 103 or current frame pixel 105 is identified, information formerly used to represent current block 103 or current frame pixel 105 may be recycled to represent current block 103 or current frame pixel 105 at its new location within current frame 101. Since the information may be recycled without having to characterize current block 103 or current frame pixel 105 with completely new information, the amount of information required to transmit current frame 101 is reduced, thereby allowing video compression to occur.

FIG. 2 is a block diagram illustrating an embodiment of the present invention. A random number generator 202 is coupled to approximator 201. Random number generator 202 provides random value rnd 203 to approximator 201. Approximator 201 receives a pixel intensity value iact 204, which may be represented by a number of bits, for example, eight. Approximator 201 also receives a minimal pixel intensity value imin 205, a maximal pixel intensity value imax 206, and a number of ranges 207 to be defined between the minimal pixel intensity value imin 205 and the maximal pixel intensity value imax 206. Alternatively, the number of ranges 207 may be replaced with a number of bits desired to be present in output 208. As an alternative to providing minimal pixel intensity value imin 205 and maximal pixel intensity value imax 206 to approximator 201, either of minimal pixel intensity value imin 205 and maximal pixel intensity value imax 206 may be provided to approximator 201 along with a difference between the maximum value and the minimum value. Rather than providing the number of ranges 207, a minimal approximation value amin and a maximal approximation value amax may be provided, with the difference between the minimal approximation value amin and the maximal approximation value amax representing the number of ranges.

Approximator 201 receives the pixel intensity value 204, the minimal pixel intensity value imin 205, the maximal pixel intensity value imax 206, and the number of ranges 207, or the alternatives thereto. Approximator 201 also receives random value rnd 203 from random number generator 202. Approximator 201 uses random value rnd 203 to perform dithering. Approximator 201 uses the number of ranges 207 to perform thresholding. As a result, approximator 201 provides an n-bit value, where 0<n< number of bits for iact, (n is preferably 2) at output 208.

Approximator 201 determines an approximation value according to the following expression:

$$\frac{(iact + rnd - imin) \times (amax - amin)}{(imax - imin)} + amin$$

Approximator 201 performs motion estimation in the sequence of images using the approximation value to determine a motion vector.

Figure 3:
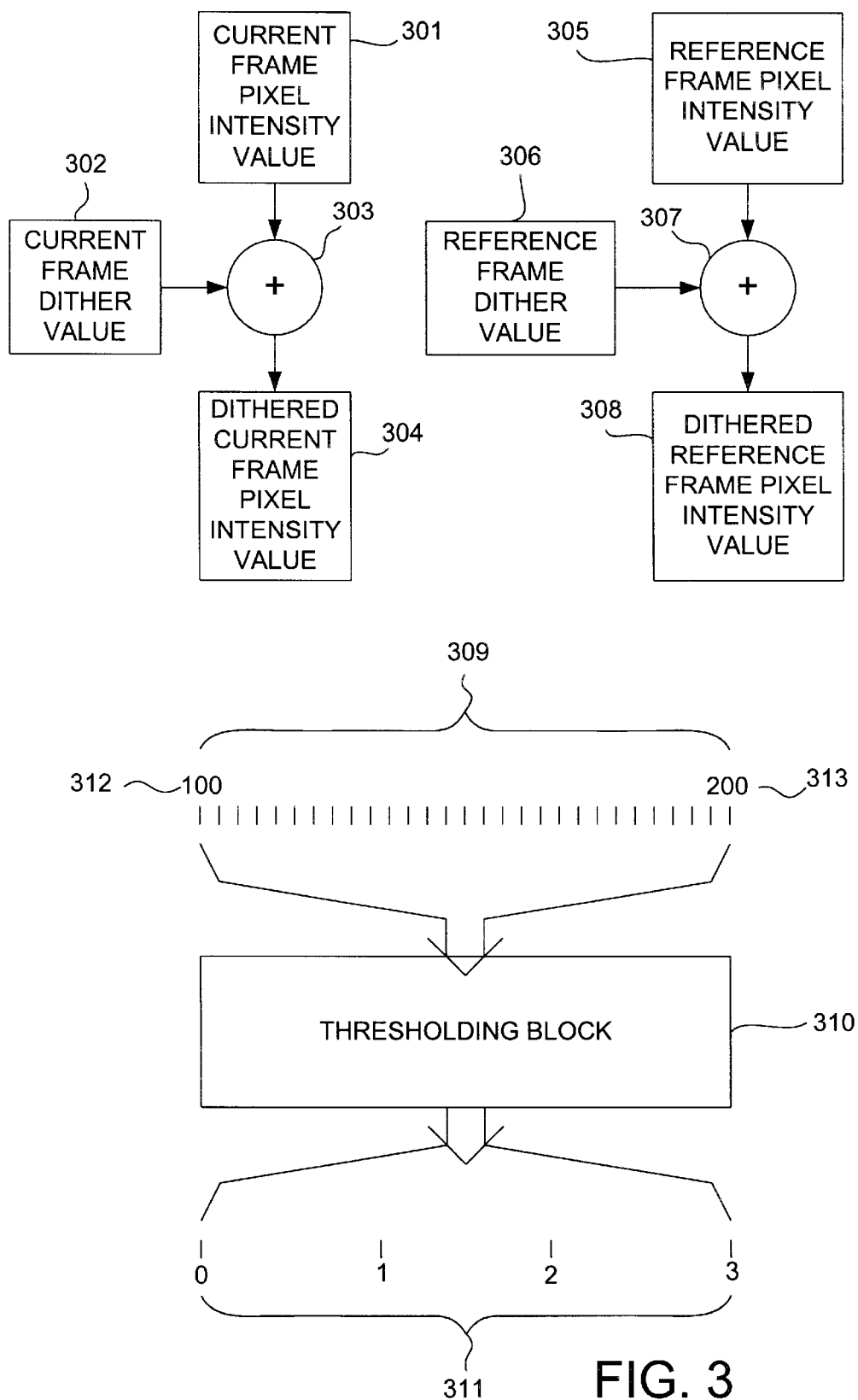
FIG. 3 is a block diagram illustrating dithering and thresholding in accordance with an embodiment of the present invention.

FIG. 3 is a block diagram illustrating dithering and thresholding in accordance with an embodiment of the present invention. Current frame pixel intensity value 301 and current frame dither value 302 are applied to dither element 303 to produce dithered current frame pixel intensity value 304. Reference frame pixel intensity value 305 and reference frame dither value 306 are applied to dither element 307 to produce dithered reference frame pixel intensity value 308. Current frame dither value 302 and reference frame dither value 306 are based on random values derived from a random number generator or pseudo-random number generator. In one embodiment, the current frame dither value 302 and the reference frame dither value 306 range from zero to (imax−imin)/(amax−amin).

Dithered current frame pixel intensity value 304 and dithered reference frame pixel intensity value 308 lie within a difference 309 between minimum value 312 and maximum value 313. Dithered current frame pixel intensity value 304 and dithered reference frame pixel intensity value 308 are applied to thresholding block 310 which provides a value for each within range 311. Range 311 has lower resolution than difference 309. Thus, the output of thresholding block 310 has fewer possible values and, therefore may be represented by fewer bits, than the input to thresholding block 310.

Figure 4:
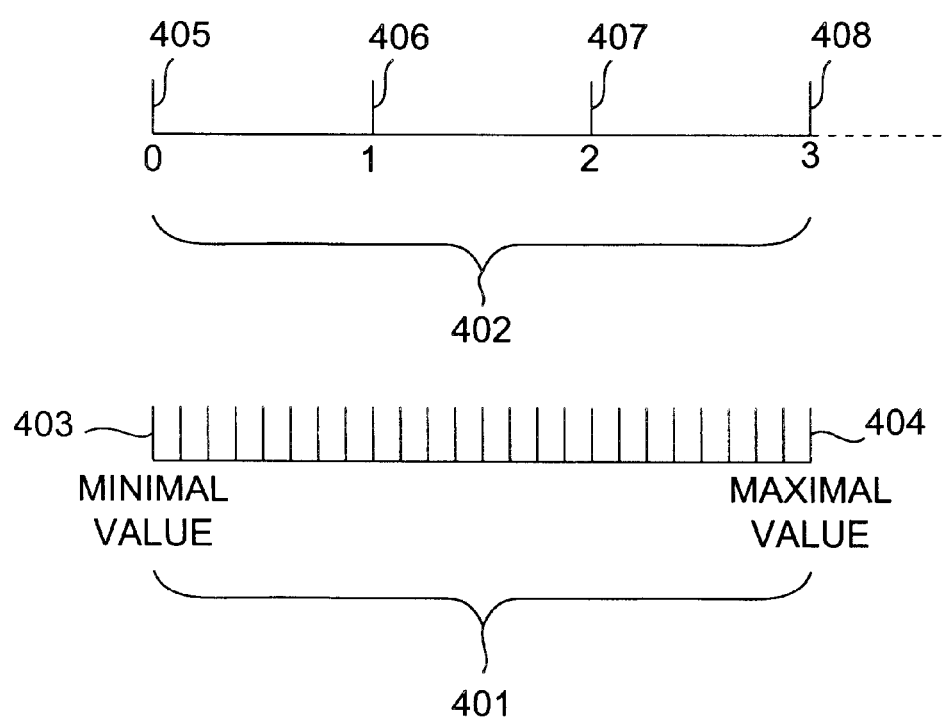
FIG. 4 is a diagram illustrating a mapping of an 8-bit value 401 to a 2-bit value 402 in accordance with an embodiment of the present invention.

FIG. 4 is a diagram illustrating a mapping of an 8-bit value 401 to a 2-bit value 402 in accordance with an embodiment of the present invention. The 8-bit value 401 lies between a minimum value 403 and a maximum value 404. Each instance of the 8-bit value 401 is represented by one of a number of discrete values 405, 406, 407, and 408 represented by 2-bit value 402. Since the process of mapping 8 bit value 401 to 2 bit value 402 involves dithering using a random number, the mapping between 8 bit value 401 and 2 bit value 402 is non-deterministic. However, statistically, an 8-bit value 401 is mapped to an appropriate one of discrete values 405, 406, 407, and 408 in accordance with its relationship to minimum value 403 and maximum value 404.

Figure 5:
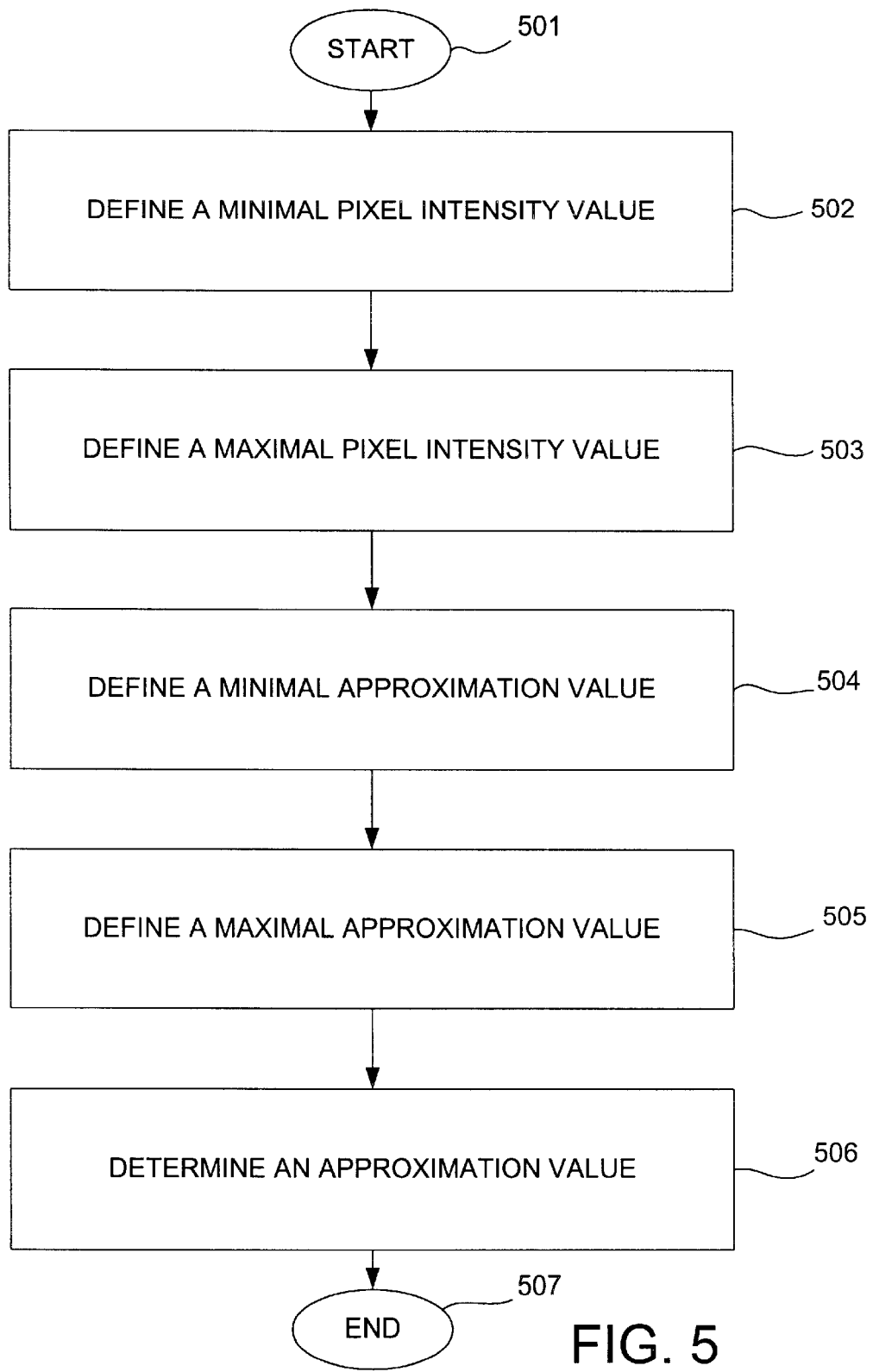
FIG. 5 is a flow diagram illustrating a process in accordance with an embodiment of the present invention.

FIG. 5 is a flow diagram illustrating a process in accordance with an embodiment of the present invention. The process begins in step 501 and continues to step 502. In step 502, a minimal pixel intensity value imin is defined. In step 503, a maximal pixel intensity value imax is defined. In step 504, a minimal approximation value amin is defined. In step 505 a maximal approximation value amax is defined. In step 506, an approximation value is determined according to the following equation:

$$\frac{(iact + rnd - imin) \times (amax - amin)}{(imax - imin)} + amin,$$

where rnd is a random value. In one embodiment, the random value rnd ranges from zero to (imax−imin)/(amax−amin). In step 507, the process ends.

Figure 6:
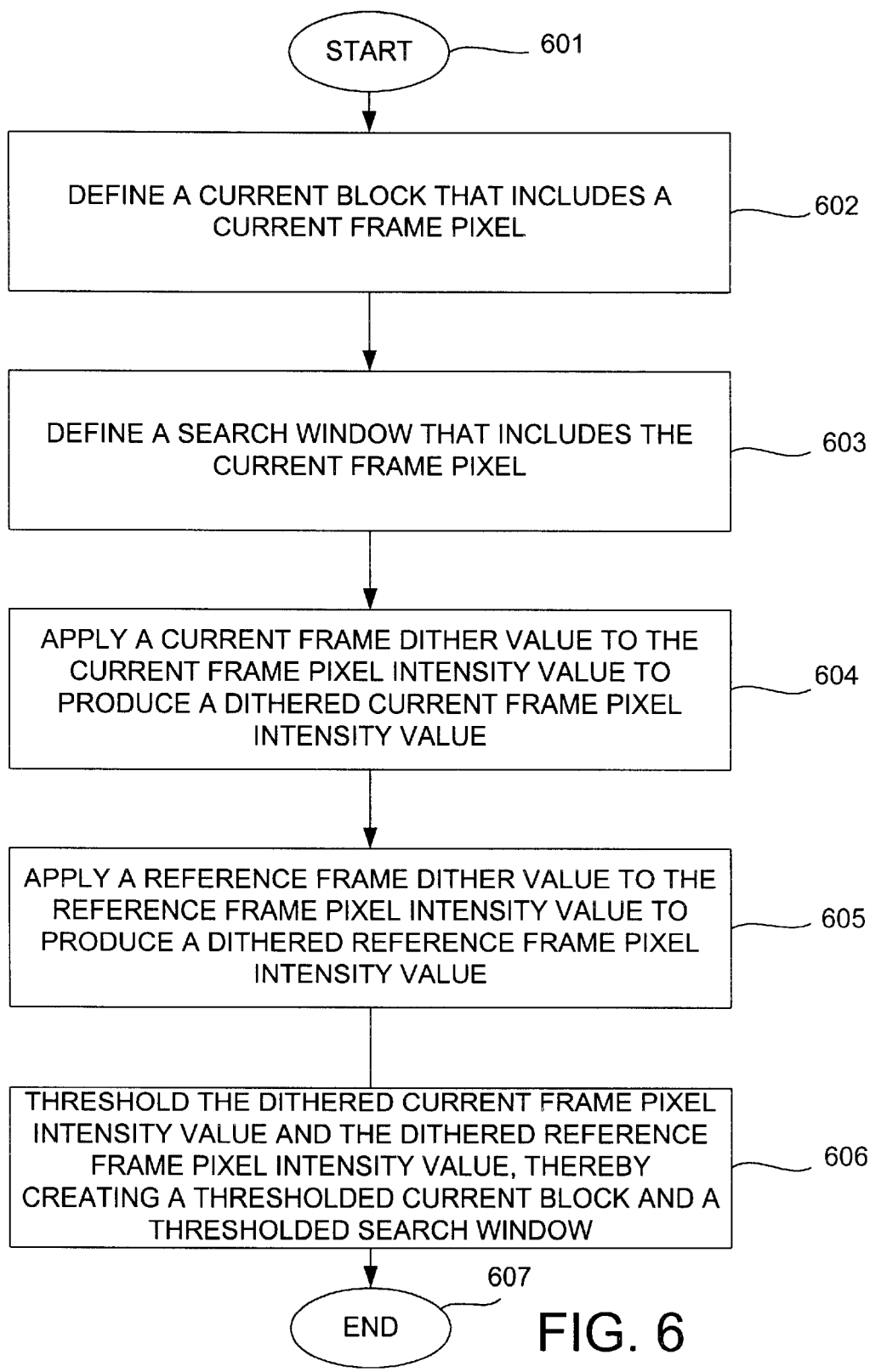
FIG. 6 is a flow diagram illustrating a process in accordance with an embodiment of the present invention.

FIG. 6 is a flow diagram illustrating a process in accordance with an embodiment of the present invention. The process begins in step 601 and continues to step 602. In step 602, a current block that includes the current frame pixel is defined. In step 603, a search window that includes the reference frame pixel is defined. In step 604, a current frame dither value is applied to the current frame pixel intensity value to produce a dithered current frame pixel intensity value. The current frame dither value may be applied to the current frame pixel intensity value by adding the current frame dither and the current frame pixel intensity value to produce the dithered current frame pixel intensity value. In step 605, a reference frame dither value is applied to the reference frame pixel intensity value to produce a dithered reference frame pixel intensity value. The reference frame dither value may be applied to the reference frame pixel intensity value by adding the reference frame dither value and the reference frame pixel intensity value to produce the dithered reference frame pixel intensity value. In step 606, the dithered current frame pixel intensity value and the dithered reference frame pixel intensity value are thresholded to create a thresholded current block and a thresholded search window.

The invention may be applied on a pixel-by-pixel basis or on a current block and search window-by-search window basis. For example, pixel intensity values for individual pixels may be converted to reduced resolution representations and used for motion estimation. Alternatively, a current block and search windows may be defined. Full-resolution values (pixel intensity values) to represent the current block and the search windows may be calculated, for example by averaging over the pixels contained within the current block or search window. The full-resolution values may be converted to reduced resolution representations in accordance with an embodiment of the invention. Motion estimation may be performed in accordance with an embodiment of the invention using the reduced resolution representations.

Figure 7:
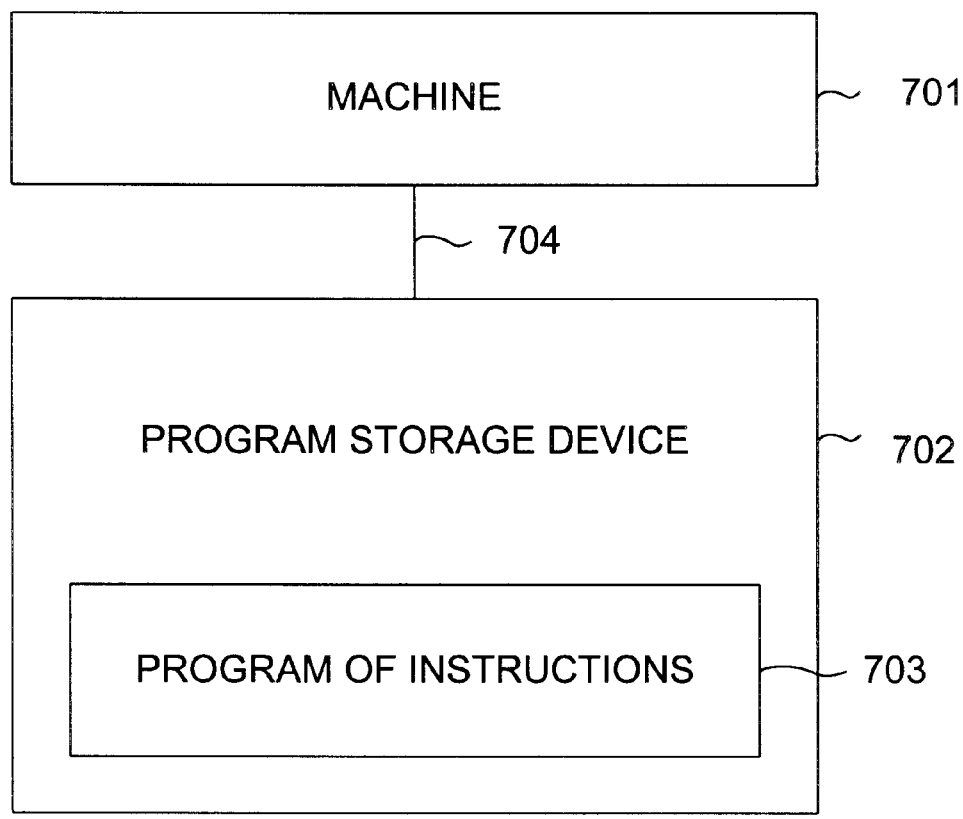
FIG. 7 is a block diagram illustrating a program storage device and a machine in accordance with an embodiment of the invention.

FIG. 7 is a block diagram illustrating a program storage device and a machine in accordance with an embodiment of the invention. Machine 701 is coupled to program storage device 702 via coupling 704. Program storage device 702 includes a program of instructions 703. The program storage device 702 is readable by the machine 701. The program storage device 702 tangibly embodies the program of instructions 703 executable by the machine 701 to perform a method of motion estimation including motion estimation quantization dithering. The method may include the steps recited with reference to FIG. 5 and/or FIG. 6. The machine 701 may be a general purpose computer system or a component thereof. Alternatively, the machine 701 may be specifically dedicated to performing the method steps described above.

Accordingly, a method and apparatus for motion estimation quantization dithering has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for approximating a pixel intensity value iact of a pixel for motion estimation to efficiently process a sequence of images, the method comprising the steps of:

defining a minimal pixel intensity value imin;

defining a maximal pixel intensity value imax;

defining a minimal approximation value amin;

defining a maximal approximation value amax;

determining an approximation value according to an expression $$\frac{(iact + rnd - imin) \times (amax - amin)}{(imax - imin)} + amin$$

where rnd is a random value; and performing motion estimation in the sequence of images using the approximation value.

2. The method of claim 1 wherein the random value is a random value from zero to $$\frac{(imax - imin)}{(amax - amin)}.$$

3. The method of claim 2 wherein the pixel intensity value iact is a current frame pixel intensity value of the pixel in a current frame.

4. The method of claim 2 wherein the pixel intensity value iact is a reference frame pixel intensity value of the pixel in a reference frame.

5. The method of claim 2 wherein a pixel intensity value range imax−imin is 256.

6. The method of claim 2 wherein the pixel intensity value iact is represented by an eight-bit representation.

7. The method of claim 6 wherein the approximation value is represented by a two-bit representation.

8. The method of claim 2 wherein the step of determining the approximation value according to the expression further comprises the step of:

determining the approximation value as being an integer portion of the expression $$\frac{(iact + rnd - imin) \times (amax - amin)}{(imax - imin)} + amin.$$

9. A method for approximating a current frame pixel intensity value of a current frame pixel in a current frame from a reference frame pixel intensity value of a reference frame pixel in a reference frame for motion estimation to efficiently process a sequence of images, the method comprising the steps of:

defining a current block that includes the current frame pixel;

defining a search window that includes the reference frame pixel;

applying a current frame dither value to the current frame pixel intensity value to produce a dithered current frame pixel intensity value;

applying a reference frame dither value to the reference frame pixel intensity value to produce a dithered reference frame pixel intensity value;

thresholding the dithered current frame pixel intensity value and the dithered reference frame pixel intensity value, thereby creating a thresholded current block and a thresholded search window.

10. The method of claim 9 further wherein the step of applying the current frame dither value to the current frame pixel intensity value to produce the dithered current frame pixel intensity value comprises the step of:

adding the current frame dither value to the current frame pixel intensity value to produce the dithered current frame pixel intensity value.

11. The method of claim 10 wherein the step of applying the reference frame dither value to the reference frame pixel intensity value to produce the dithered reference frame pixel intensity value comprises the step of:

adding the reference frame dither value to the reference frame pixel intensity value to produce the dithered reference frame pixel intensity value.

12. The method of claim 9 wherein the step of thresholding the dithered current frame pixel intensity value and the dithered reference frame pixel intensity value further comprises the steps of:

allocating the dithered current frame pixel intensity value to a first approximation value among a plurality of approximation values; and allocating the dithered reference frame pixel intensity value to a second approximation value among the plurality of approximation values.

13. The method of claim 12 further comprising the step of:

comparing the first approximation value to the second approximation to determine a match between the current frame pixel intensity value and the reference frame pixel intensity value.

14. A program storage device readable by a machine, tangibly embodying a program of instructions executable by the machine to perform a method for approximating a pixel intensity value iact of a pixel for motion estimation to efficiently process a sequence of images, the method comprising the steps of:

defining a minimal pixel intensity value imin;

defining a maximal pixel intensity value imax;

defining a minimal approximation value amin;

defining a maximal approximation value amax;

determining an approximation value according to an expression $$\frac{(iact + rnd - imin) \times (amax - amin)}{(imax - imin)} + amin$$

where rnd is a random value; and performing motion estimation in the sequence of images using the approximation value.

15. The program storage device of claim 14 wherein the random value is a random value from zero to $$\frac{(imax - imin)}{(amax - amin)}.$$

16. The program storage device of claim 15 wherein the pixel intensity value iact is a current frame pixel intensity value of the pixel in a current frame.

17. The program storage device of claim 15 wherein the pixel intensity value iact is a reference frame pixel intensity value of the pixel in a reference frame.

18. The program storage device of claim 15 wherein a pixel intensity value range imax−imin is 256.

19. The program storage device of claim 15 wherein the pixel intensity value iact is represented by an eight-bit representation.

20. The program storage device of claim 19 wherein the approximation value is represented by a two-bit representation.

21. The program storage device of claim 15 wherein the step of determining the approximation value according to the expression further comprises the step of:

determining the approximation value as being an integer portion of the expression $$\frac{(iact + rnd - imin) \times (amax - amin)}{(imax - imin)} + amin.$$

22. A program storage device readable by a machine, tangibly embodying a program of instructions executable by the machine to perform a method for approximating a current frame pixel intensity value of a current frame pixel in a current frame from a reference frame pixel intensity value of a reference frame pixel in a reference frame for motion estimation to efficiently process a sequence of images, the method comprising the steps of:

defining a current block that includes the current frame pixel;

defining a search window that includes the reference frame pixel;

applying a current frame dither value to the current frame pixel intensity value to produce a dithered current frame pixel intensity value;

applying a reference frame dither value to the reference frame pixel intensity value to produce a dithered reference frame pixel intensity value;

thresholding the dithered current frame pixel intensity value and the dithered reference frame pixel intensity value, thereby creating a thresholded current block and a thresholded search window.

23. The program storage device of claim 22 further wherein the step of applying the current frame dither value to the current frame pixel intensity value to produce the dithered current frame pixel intensity value comprises the step of:

adding the current frame dither value to the current frame pixel intensity value to produce the dithered current frame pixel intensity value.

24. The program storage device of claim 23 wherein the step of applying the reference frame dither value to the reference frame pixel intensity value to produce the dithered reference frame pixel intensity value comprises the step of:

adding the reference frame dither value to the reference frame pixel intensity value to produce the dithered reference frame pixel intensity value.

25. The program storage device of claim 22 wherein the step of thresholding the dithered current frame pixel intensity value and the dithered reference frame pixel intensity value further comprises the steps of:

allocating the dithered current frame pixel intensity value to a first approximation value among a plurality of approximation values; and allocating the dithered reference frame pixel intensity value to a second approximation value among the plurality of approximation values.

26. The program storage device of claim 25 further comprising the step of:

comparing the first approximation value to the second approximation to determine a match between the current frame pixel intensity value and the reference frame pixel intensity value.

27. Apparatus for approximating a pixel intensity value iact of a pixel for motion estimation to efficiently process a sequence of images, the apparatus comprising:

a random number generator for producing a random value rnd;

an approximator operatively coupled to the random number generator for receiving the random value rnd, a minimal pixel intensity value imin, a maximal pixel intensity value imax, a minimal approximation value amin, a maximal approximation value amax, the approximator determining an approximation value according to an expression $$\frac{(iact + rnd - imin) \times (amax - amin)}{(imax - imin)} + amin$$

and performing motion estimation in the sequence of images using the approximation value.

28. The apparatus of claim 27 wherein the random value is a random value from zero to $$\frac{(imax - imin)}{(amax - amin)}.$$

* * * * *